April 29, 1952 S. J. BEGUN 2,594,848

MAGNETIC REPRODUCING DEVICE WITH MEANS TO PREVENT ACCIDENTAL ERASE OF RECORD MEDIUM

Filed Dec. 12, 1950 2 SHEETS—SHEET 1

INVENTOR.
SEMI JOSEPH BEGUN
BY
Eber J. Hyde
ATTORNEY

*INVENTOR.*
SEMI JOSEPH BEGUN
*BY*
Ebes J. Hyde
ATTORNEY

Patented Apr. 29, 1952

2,594,848

UNITED STATES PATENT OFFICE 2,594,848

MAGNETIC REPRODUCING DEVICE WITH MEANS TO PREVENT ACCIDENTAL ERASE OF RECORD MEDIUM

Semi Joseph Begun, Cleveland Heights, Ohio, assignor to The Brush Development Company, Cleveland, Ohio, a corporation of Ohio Application December 12, 1950, Serial No. 200,346

6 Claims. (Cl. 179—100.2)

Figure 1:
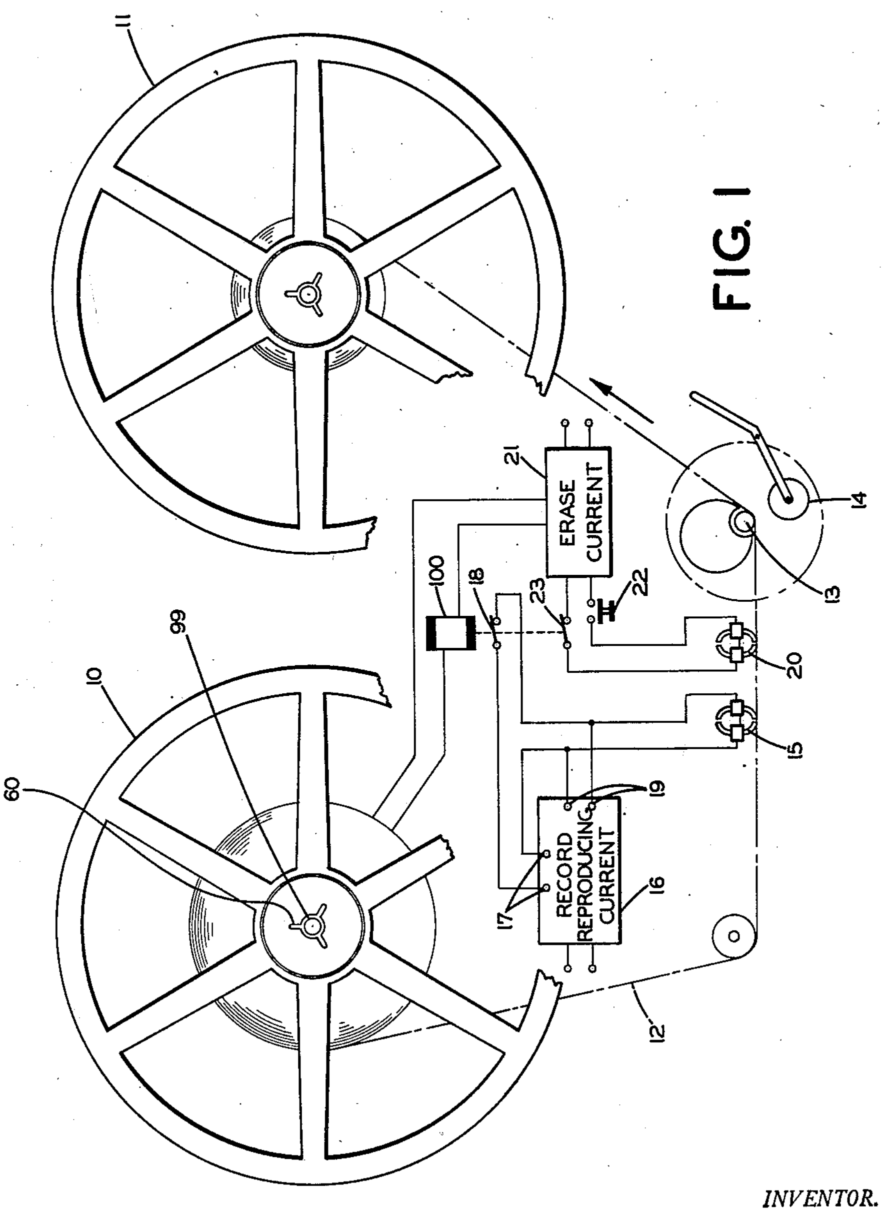

This invention is a continuation-in-part of my application Serial No. 713,963 filed December 4, 1946, for System to Prevent Accidental Rerecording on a Magnetic Record, now Patent No. 2,538,892, issued January 23, 1951.

This invention relates to means for preventing the inadvertent erasing of a record which has been recorded on a magnetizable medium.

Among the objects of this invention are novel magnetic recording and reproducing devices embodying features which make it impossible to inadvertently erase a magnetic record which it is desired to keep intact and free from magnetic disturbances.

Another object of the invention is to provide a device which may be replaceably connected to a reel on which is wound a length of recorded magnetic medium to cooperate with a magnetic reproducing device to prevent inadvertent erase of the record medium.

For a better understanding of the present invention, together with other and further objects thereof, reference is had to the following description taken in connection with the accompanying drawings, and its scope will be pointed out in the appended claims.

Figure 2:
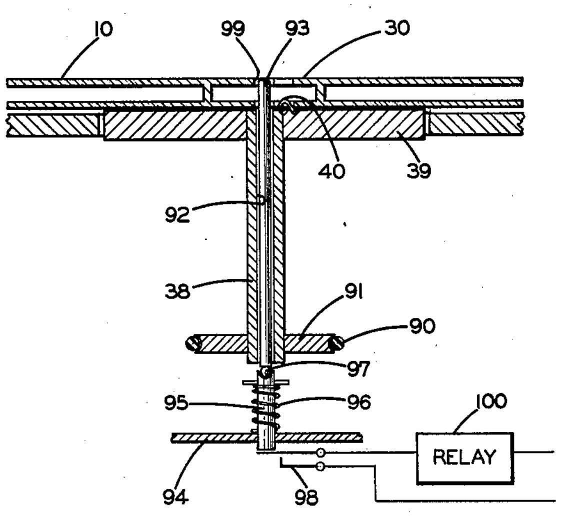
Figure 3:
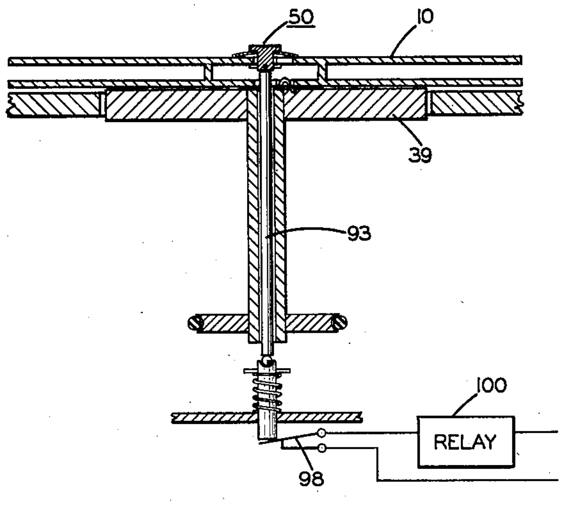
Figure 4:
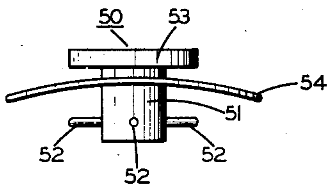

In the drawings:

Fig. 1 is a schematic view of a magnetic recording and reproducing device embodying the novel means to prevent accidental erasure of the record medium; Fig. 2 is a sectional view of the device of this invention with the reel in such condition that the record medium may be erased at the will of the operator; Fig. 3 is a sectional view of the device of this invention with the reel in such condition that the record medium cannot be inadvertently erased; and Fig. 4 is a detailed view of the device which may be connected to the reel in Fig. 2 to prevent the inadvertent erasure.

In an aspect of the present invention there is provided for a magnetic recording and reproducing device a pair of spaced-apart reels at least one of which has an opening in its hub. A record medium of the wire or tape type is wound on the reels. An energizable erase head is provided adjacent the record member for erasing the record when the head is energized. Circuit means which include a power source and a switch are connected to the erase head for selectively energizing the head to erase the record member. The magnetic recording and reproducing device includes means for driving the reel. Part of this means comprises a hollow shaft upon which the reel having the hub opening is mounted and a movable rod extends up through the hollow shaft and terminates adjacent the hub opening in the reel. When this rod is moved, as by placing a reel upon it, the switch in the energizing circuit is actuated to change the erasing circuit. For example, actuating means may be connected in the hub opening of the reel so that when the reel is placed on the hollow drive shaft, the actuating means causes the movable rod to be depressed to close the switch in the energizing circuit, thereby to completely disconnect the erasing circuit so that the operator cannot inadvertently erase the signal which is recorded on the recorded medium.

With reference to Fig. 1, there is shown two spaced-apart reels 10 and 11 between which there is wound a record medium 12. A drive capstan 13 is provided and a spring-biased coupling roller 14 is adapted to pinch the record member 12 against the drive roller 13 to cause the record member 12 to be driven in the direction of the arrow. Simultaneously, power is supplied to the reel 11 to cause the reel 11 to rotate in a direction to take up the record member 12 as it is driven past the drive roller 13. A more detailed description of the operation of the drive mechanism may be found in my application Serial No. 723,735.

A recording and reproducing head 15 is located in flux linkage relationship with the record member 12 and suitable circuit means 16 including a source of bias current are provided for recording signals on the record member 12 and suitable reproducing circuit means are provided for reproducing the signals from the record member. As is well known in the art the recording-reproducing circuits may include many common parts, but the bias section is operative only during recording.

The terminals 17 are the signal output terminals and are utilized only during a recording process, and the terminals 19 are the signal input terminals and are utilized only during a reproducing operation.

An erasing head 20 is located adjacent the record member 12 whereby the operator may selectively erase the record from the record member, thereby to condition it to receive and retain a new record. The erase head 20 is energized by erase current from the erase current supply means 21 through a circuit which includes an erase button 22 and a switch 23. Normally the switch 23 is closed, as is shown in Fig. 1, so that when the operator desires to erase a record on the medium 12 he pushes the erase button 22 thereby completing the circuit from the current supply means 21 through the erase head 20. This energizes the head 20 and establishes an obliterating flux as is well known to the art.

It sometimes happens that the owner of a magnetic recording and reproducing device inadvertently erases or over-records on a record which he meant to keep. This is sometimes done by the operator himself accidentally closing the erase button 22 or accidentally actuating the record control when a desired record is already on the record member in the machine. It may also happen by someone not familiar with the recording and reproducing machine actuating the wrong controls while the machine is running. In order to prevent this accidental erasure, and accidental over-recording there is provided by this invention means which, when properly used, eliminate many chances of accidental spoilage of a desired record. This means comprises a relay 100 energized by alternating or direct current from the erase current supply means 21 or from any other suitable source such as the recording-reproducing amplifier. The relay 100, when energized, opens the switch 23 in the erase current supply circuit and keeps it open until the relay is deenergized. When the switch 23 is opened, the erase button 22 may be pushed without erasing the record member as the circuit from the erase current supply means 21 through the erase head 20 is broken.

When an operator decides that a recording is of sufficient value that he does not want to run the risk of its being erased, he merely connects the actuating device, shown in detail in Fig. 4 and identified by reference character 50, to the reel on which the record member is wound. This actuating device is shown connected to the reel 10 in Fig. 3. From then on when the reel is used the erase circuit is automatically broken to prevent accidental erasure.

With the actuating device 50 connected to the reel 10 it is also impossible to record a new record on the prized recording as the relay 100 is also used to break the recording circuit 17 between the circuit 16 and the recording head 15. This circuit break is achieved by utilizing relay 100 to open the switch 18 to prevent either the signal or the bias current from effecting a recording on member 12. Thus, with the actuating device 50 in place it is impossible to erase the record on the record member 12 and it is impossible to superimpose a bias current signal or a new record signal on the record member 12.

Fig. 2 shows the reel 10 without the actuating device 50. The reel 10 has a hub portion 30 in which there is an aperture 99. The reel 10 rests upon the rotatable collar or turntable 39 and a drive pin 40 which is connected to the rotatable collar 39 engages the lower flange of the reel 10 to cause the reel to rotate with the collar 39. A shaft 38 is connected to the rotatable collar 39 and is driven by the belt 90 which is in frictional engagement with a pulley 91 affixed to the shaft 38. The shaft 38 has a central longitudinal aperture 92 extending through the entire shaft. A movable rod 93 is slidably mounted within the hollow shaft 38 and its upper end terminates adjacent the hub opening aperture 99 in the upper flange of the reel 10. Slidably mounted on a supporting member 94 directly under the shaft 38 is a follower 95 which is biased upwardly by a spring 96. The top of the follower 95 is recessed to accommodate a ball 97 which contacts the rod 93, urging the rod 93 to its higher position where the top of the rod 93 extends above the top of the shaft 38. Immediately below the lower end of the follower 95 a switch 98 is mounted so that in the up-position of the rod 93, switch 98 is open and when rod 93 is moved downwardly, switch 98 is closed. The switch 98 is in the circuits of the relay 100 so that when switch 98 is open the relay 100 cannot be energized and the erase current supply circuit and the signal recording circuit 17 may then be closed by the usual erase and record controls. When the switch 98 is closed, the relay 100 is energized from a suitable power source and the erase head 20 cannot be energized by closing push button 22, nor can a new record be superimposed on the old record, as has previously been described.

When an ordinary reel 10 is put on the rotatable turntable 39, the rod 93 is in its upward position and the operator may erase the record on the medium by pushing the erase button 22, and may make a new record on medium 12. When the operator does not want to undergo the risk of having an unusually good record erased, he connects the actuating device, shown in detail in Fig. 4, to the reel 10. Then, as is shown in Fig. 3, when the reel is placed on the turntable 39, the actuating device 50 causes the movable rod 93 to be depressed thereby closing the switch 98 and energizing the relay 100 to cause switches 18 and 23 to be opened.

Any suitable actuating device may be connected to the reel 10. One suitable device is comprised of a central shaft 51 which fits within the aperture 99 in the hub of the reel 10. At the lower end of the shaft 51, there are three spaced-apart fingers 52 connected to the shaft 51 and at the other end there is an enlarged head portion 53. A curved spring washer 54 is loosely positioned around the shaft 51 between the fingers 52 and the head 53.

As is seen in Fig. 1, the aperture 99 in the hub of the reel 10 includes three radially extending notches 60. When the actuating device 50 is to be connected to the reel 10, the three fingers 52 are aligned with the three notches 60 and the shaft 51 is positioned in the aperture 99. The operator puts his finger on the head 53 and pushes toward the reel 10, causing the spring washer 54 to be flattened and the fingers 52 to pass through the upper flange of the reel 10 to a location just underneath the flange. The operator then turns the head 53 with respect to the reel 10 to cause the fingers 52 to lie directly underneath the upper flange at a location between the notches 60. The operator then releases the head 53 and the spring washer 54 holds the actuating device in place.

If the operator decides to erase the record, from the record member which is wound on a reel equipped with the actuating device 50, he merely releases the actuating device 50 by pushing down on the head 53 and turning the entire device until the three fingers 52 are in registration in the three notches 60 in the reel, at which point the actuating device may be easily lifted away from the reel 10.

The system shown in Fig. 1 utilizes a switch operated relay 100 for opening switches 18 and 23 in the bias and erase current supply circuits, but it is also within the scope of the invention to use the movable rod 93 to directly open switches 18 and 23 thereby to disconnect the bias and erase current supply sources from the transducer heads 15 and 20.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a magnetic recording-reproducing device: a pair of spaced-apart reels one of which has a hub opening; a recording medium wound on said reels; an energizable transducer head for altering the record on said record member when said transducer head is energized; circuit means including a switch connected to said transducer head for selectively energizing said head in accordance with the position of said switch; means for driving said reels including a hollow shaft upon which said reel having said hub opening is mounted; a movable rod extending up through said hollow shaft and terminating adjacent the hub opening in said reel, said rod upon moving actuating said switch; and actuating means connected to the hub of said reel for closing said hub opening to cause said movable rod to move when said reel is placed on said hollow shaft to actuate said switch.

2. A magnetic recording-reproducing device as set forth in claim 1, further characterized by said transducer head being an erase head, and by said actuating means opening said switch.

3. In a magnetic recording-reproducing device; a pair of spaced-apart reels one of which has a hub opening, a record medium wound on said reels, an energizable transducer head for altering the record on said record member when said transducer head is energized, circuit means including a power source and a switch connected to said transducer head for selectively energizing said transducer head in accordance with the position of said switch, means for driving said reels including a hollow shaft upon which said reel having said hub opening is mounted, a movable rod extending up through said hollow shaft and terminating adjacent the hub opening in said reel, said rod upon moving actuating the switch in said circuit means, and actuating means connected to the hub of said reel for closing said hub opening to cause said movable rod to move when said reel is placed on said hollow shaft to change the position of said switch.

4. A magnetic recording-reproducing device as set forth in claim 3, further characterized by said actuating means including means whereby it is replaceably connectable to said reel.

5. In a magnetic recording-reproducing device; a pair of spaced-apart reels one of which has a hub opening, a record medium wound on said reels, an energizable erase head for erasing the record on said record member when said erase head is energized, circuit means including a power source and a switch connected to said erase head for selectively energizing said erase head in accordance with the position of said switch, means for driving said reels including a hollow shaft upon which said reel having said hub opening is mounted, a movable rod extending up through said hollow shaft and terminating adjacent the hub opening in said reel, said rod upon moving actuating the switch in said circuit means, and actuating means connected to the hub of said reel for closing said hub opening to cause said movable rod to move when said reel is placed on said hollow shaft to change the position of said switch.

6. A reel for a magnetic recording-reproducing device having a reel drive shaft comprising: a hub upon which a magnetizable record member is to be wound, two spaced-apart flange members connected one to either end of said hub and between which said record member is wound, each of said two flange members having a hub opening for receiving said reel drive shaft, and actuating means including means for securing said actuating means in one of said hub openings for closing said hub opening.

SEMI JOSEPH BEGUN.

No references cited.